United States Patent
Kurihara et al.

(10) Patent No.: US 8,227,390 B2
(45) Date of Patent: Jul. 24, 2012

(54) BINDER RESIN FOR FRICTION MATERIAL, BINDER RESIN COMPOSITION FOR FRICTION MATERIAL, COMPOSITE MATERIAL FOR FRICTION MATERIAL CONTAINING THE SAME, FRICTION MATERIAL AND PRODUCTION METHOD THEREOF

(75) Inventors: Shou Kurihara, Tokyo (JP); Hiroshi Idei, Tokyo (JP); Yoshihiro Aoyagi, Tokyo (JP); Motoki Kuroe, Tokyo (JP)

(73) Assignee: Akebono Brake Industry Co., Ltd., Chuo-ku, Tokyo (JP)

( * ) Notice: Subject to any disclaimer, the term of this patent is extended or adjusted under 35 U.S.C. 154(b) by 677 days.

(21) Appl. No.: 12/323,914

(22) Filed: Nov. 26, 2008

(65) Prior Publication Data

US 2009/0137434 A1    May 28, 2009

(30) Foreign Application Priority Data

Nov. 28, 2007   (JP) .................................. 2007-307810
Mar. 31, 2008   (JP) .................................. 2008-089777

(51) Int. Cl.
*C10M 149/16*   (2006.01)
(52) U.S. Cl. ..................... 508/270; 508/283; 508/100
(58) Field of Classification Search .................. 508/283, 508/100, 270
See application file for complete search history.

(56) References Cited

U.S. PATENT DOCUMENTS

| | | | |
|---|---|---|---|
| 6,323,270 B1 * | 11/2001 | Ishida | 524/445 |
| 2004/0084258 A1 * | 5/2004 | Fujikawa et al. | 188/73.1 |
| 2005/0234179 A1 * | 10/2005 | Haraguchi et al. | 524/445 |
| 2009/0011962 A1 * | 1/2009 | Chinda et al. | 508/167 |

FOREIGN PATENT DOCUMENTS

| | | |
|---|---|---|
| JP | 8-74896 | 3/1996 |
| JP | 9-272786 | 10/1997 |
| JP | 2003-206390 | 7/2003 |
| RO | 79996 A * | 9/1982 |

OTHER PUBLICATIONS

Agag, T., Takeichi, T., J. Polymer Sci., Part A: Polymer Chemistry, 2007, 45, 1878-1888.*

* cited by examiner

Primary Examiner — Jim Goloboy
(74) *Attorney, Agent, or Firm* — Drinker Biddle & Reath LLP

(57) ABSTRACT

The present invention provides a binder resin for a friction material, which enables high-temperature short-time thermoforming and can omit a post-curing step and suppress the generation of a pyrolysis component at molding; a friction material using the binder resin; and a binder resin composition for a friction material, which is enhanced in the heat resistance and can suppress a rapid increase of the wear amount, and in addition to these properties, which has good dynamic property and enables high-temperature short-time thermoforming. The present invention relates to a binder resin for a friction material which comprises (A) one kind or two or more kinds of polybenzoxazine resins selected from a condensation reaction product of an aminophenol compound with formaldehydes and a condensation reaction product of a bifunctional phenol compound and a bifunctional amine compound with formaldehydes; a binder resin composition for a friction material which comprises: the component (A); and further (B) one kind or two or more kinds of particles selected from an inorganic particle and an inorganic-organic composite particle, and a friction material obtained by the binder resin or binder resin composition.

12 Claims, No Drawings

BINDER RESIN FOR FRICTION MATERIAL, BINDER RESIN COMPOSITION FOR FRICTION MATERIAL, COMPOSITE MATERIAL FOR FRICTION MATERIAL CONTAINING THE SAME, FRICTION MATERIAL AND PRODUCTION METHOD THEREOF

CROSS-REFERENCE TO RELATED APPLICATIONS

This application claims priority from Japanese Patent Application No. 2007-307810 filed on Nov. 28, 2007 and No. 2008-089777 filed on Mar. 31, 2008, the entire subject matter of which is incorporated herein by reference.

BACKGROUND OF THE INVENTION

1. Field of the Invention

The present invention relates to a binder resin for a friction material, a friction material using the binder resin, and a production method thereof. More specifically, the present invention relates to a binder resin for a friction material, which enables high-temperature short-time thermoforming and can omit a post-curing step and suppress the generation of a pyrolysis ingredient at molding; a friction material using the binder resin, which has excellent heat resistance and can be enhanced in a minimum friction coefficient and reduced in a wear amount; and a method for producing the friction material with good productivity by not applying a post-heating operation.

The present invention also relates to a binder resin composition for a friction material, a composite material for a friction material containing the same, and a friction material. More specifically, the present invention relates to a binder resin composition for a friction material, which is enhanced in the heat resistance and can suppress a rapid increase of the wear amount and in addition to these properties, which has good dynamic property and enables high-temperature short-time thermoforming; a composite material for a friction material containing the same; and a friction material obtained using the composite material.

2. Description of the Related Art

A non-asbestos friction material for a brake which is used in a brake pad of an automobile or the like is produced, for example, by blending a lubricant such as graphite, antimony sulfide and molybdenum disulfide, a filler such as swelling clay mineral, barium sulfate, calcium carbonate and calcium hydroxide, and a friction modifier such as cashew dust, ceramic powder and metal powder, with a substrate comprising a metal fiber such as steel fiber and copper fiber, an inorganic fiber such as ceramic fiber and carbon fiber, or an organic fiber such as aramid fiber, further blending a binder resin (binding material) to these ingredients, and after thoroughly stirring and mixing the blend, and compression-molding the mixture under heating.

As for the binder resin, a phenol resin or an epoxy resin has been heretofore used in many cases. However, in the case of a friction material using the phenol resin, a molding failure such as cracks or bulges occur in the thermoforming step because of a gas generated due to hexamethylenetetramine used as a curing agent and causes reduction in the production yield, and at the same time, there is concern about the environmental pollution by ammonia as a main component of the gas. The epoxy resin has a problem that the heat resistance is insufficient.

For solving these problems, a polybenzoxazine resin that generates no gas in the thermal curing process and can give a friction material excellent in the heat resistance and strength is used with an attempt to substitute for the phenol resin or epoxy resin as a binder resin of the friction material. For example, a friction material comprising a heat-resistant resin as the binding material, a reinforced fiber as the substrate, graphite, a metal powder, an inorganic filler and the like is disclosed, wherein the heat-resistant resin contains a dihydrobenzoxazine ring (polybenzoxazine resin) (see, for example, Patent Document 1).

However, the polybenzoxazine resin requires a long heat curing time and various improvements are being made thereon. As an example of the improvement technique, a thermosetting resin composition obtained by mixing a polybenzoxazine resin and a phenol novolak resin has been proposed (see, for example, Patent Document 2), but such a thermosetting resin composition is reduced in the heat resistance and when molded at a high temperature of 180° C. or more, the molecular chain of the polybenzoxazine resin is thermally decomposed to release aniline. Therefore, the resin composition needs to be molded at less than 180° C., and there is a limit in performing high-temperature short-time molding for raising the production efficiency.

Also, the polybenzoxazine resin requires high-temperature molding for a long time, and in view of productivity and the like, improvement is needed on its curing property. As an example of the improvement technique therefor, a thermosetting resin composition comprising from 5 to 30% by mass of a thermosetting resin having a dihydrobenzoxazine ring (polybenzoxazine resin) and from 70 to 95% by mass of a novolak-type phenol resin is disclosed (see, for example, Patent Document 3). Such a thermosetting resin composition is improved in view of curing property, but in the friction material using this composition, heat resistance inherent in the polybenzoxazine resin is not fully exerted and when the friction material is placed under a high temperature of about 600° C., thermal decomposition rapidly proceeds, as a result, the wear amount of the friction material sharply increases.

[Patent Document 1] JP-A-8-74896
[Patent Document 2] JP-A-9-272786
[Patent Document 3] JP-A-2003-206390

SUMMARY OF THE INVENTION

A first object of the present invention is to provide a binder resin for a friction material, which enables high-temperature short-time thermoforming and can omit a post-curing step and suppress the generation of a pyrolysis component at molding; a friction material using the binder resin, which has excellent heat resistance and can be enhanced in the minimum friction coefficient and reduced in the wear amount; and a method for producing the friction material with good productivity by not applying a post-heating operation.

A second object of the present invention is to provide a binder resin composition for a friction material, which is enhanced in the heat resistance and can suppress a rapid increase of the wear amount, and in addition to these properties, which has good dynamic property and enables high-temperature short-time thermoforming; a composite material for a friction material containing the same; and a friction material obtained using the composite material.

As a result of intensive studies, the present inventors have found that, as a binder resin for a friction material, a polybenzoxazine resin obtained by reacting an aminophenol compound with a formaldehyde resin and a polybenzoxazine resin obtained by reacting a bifunctional phenol compound and a bifunctional amine compound with formaldehydes can meet the first object.

It has also been found that by using the above-described polybenzoxazine resin as the binder resin, the objective high-performance friction material can be produced with good productivity without applying a post-heating operation.

Furthermore, the present inventors have found that the second object can be attained by a resin composition containing: a high molecular-weight polybenzoxazine resin having a specific structure as the binder resin; and one kind or two or more kinds of particles selected from an inorganic particle and an inorganic-organic composite particle, preferably a particle obtained by a sol-gel reaction.

The present invention has been accomplished based on these findings.

The gist of the present invention is as follows.

[1] A binder resin for a friction material, which comprises (A) one kind or two or more kinds of polybenzoxazine resins selected from a condensation reaction product of an aminophenol compound with a formaldehyde and a condensation reaction product of a bifunctional phenol compound and a bifunctional amine compound with a formaldehyde.

[2] The binder resin for a friction material according to [1], wherein the aminophenol compound is a compound represented by formula (1):

[Chem 1]

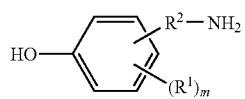

(1)

(wherein $R^1$ represents an alkyl or alkoxy group having 1 to 4 carbon atoms, $R^2$ represents a single bond, a methylene group, an ethylene group or a trimethylene group, and m represents an integer of 0 to 3).

[3] The binder resin for a friction material according to [1] or [2], wherein the aminophenol compound is p-aminophenol.

[4] The binder resin for a friction material according to any one of [1] to [3], wherein the bifunctional phenol compound is 2,2-bis(4-hydroxyphenyl)propane.

[5] The binder resin for a friction material according to any one of [1] to [4], wherein the bifunctional amine compound is 4,4'-diaminodiphenylmethane.

[6] A binder resin composition for a friction material, which comprises:

(A) one kind or two or more kinds of polybenzoxazine resins selected from a condensation reaction product of an aminophenol compound with a formaldehyde and a condensation reaction product of a bifunctional phenol compound and a bifunctional amine compound with a formaldehyde; and (B) one kind or two or more kinds of particles selected from an inorganic particle and an inorganic-organic composite particle.

[7] The binder resin composition for a friction material according to [6], wherein the component (B) is a particle obtained by a sol-gel reaction.

[8] The binder resin composition for a friction material according to [6] or [7], wherein the component (B) is a hydrolysis condensate of a metal alkoxide compound represented by formula (2):

(wherein $Q^1$ represents a hydrocarbon group having 1 to 10 carbon atoms; $Q^2$ represents an alkyl group having 1 to 6 carbon atoms; M represents Si, Ti, Zr or Al; x is a valence of M and represents 3 or 4; y represents an integer of 0 to 2 when M is Si, Ti or Zr, and represents 0 or 1 when M is Al; when a plurality of $Q^1$ are present, the plurality of $Q^1$ may be the same or different; and the plurality of $OQ^2$ may be the same or different).

[9] The binder resin composition for a friction material according to any one of [6] to [8], wherein an average particle diameter of the component (B) is from 10 to 300 nm.

[10] The binder resin composition for a friction material according to any one of [6] to [9], wherein a content of the component (B) is from 1 to 30% by mass in terms of a metal atom based on a total amount of the components (A) and (B).

[11] The binder resin composition for a friction material according to any one of [6] to [10], wherein the component (B) is caused to be present in a reaction system at a synthesis of the polybenzoxazine resin or after the synthesis reaction.

[12] A composite material for a friction material, which comprises the binder resin composition for a friction material according to any one of [6] to [11], a fibrous reinforcement, a lubricant and a friction modifier.

[13] A friction material obtained by curing a composite material containing the binder resin for a friction material according to any one of [1] to [5].

[14] A friction material obtained by curing the composite material for a friction material according to [12].

[15]. A process for producing a friction material, which comprises thermoforming a composite material containing the binder resin for a friction material according to any one of [1] to [5] at a temperature of 150 to 300° C.

[16] The process for producing a friction material according to [15], wherein a post-heating operation is omitted after the thermoforming.

According to the present invention, a binder resin for a friction material, which enables high-temperature short-time thermoforming and can omit a post-curing step and suppress the generation of a pyrolysis component at molding; a friction material using the binder resin, which has excellent heat resistance and can be enhanced in the minimum friction coefficient and reduced in the wear amount; and a method for producing the friction material with good productivity by not applying a post-heating operation, can be provided.

Also, according to the present invention, a binder resin composition for a friction material, which is enhanced in the heat resistance and can suppress a rapid increase of the wear amount, and in addition to these properties, which has good dynamic property and enables high-temperature short-time thermoforming; a thermosetting resin composite material containing the same; and a friction material obtained using the composite material, can be provided.

DETAILED DESCRIPTION OF THE INVENTION

First, the binder resin for a friction material of the present invention is described below.

[Binder Resin for Friction Material]

The binder resin for a friction material of the present invention (hereinafter sometimes simply referred to as a "binder resin") contains (A) one kind or two or more kinds of polybenzoxazine resins selected from a condensation reaction product (hereinafter referred to as a "polybenzoxazine resin I") of an aminophenol compound with formaldehydes and a condensation reaction product (hereinafter referred to as a "polybenzoxazine resin II") of a bifunctional phenol compound and a bifunctional amine compound with formaldehydes. The binder resin of the present invention mainly includes two embodiments, that is, an embodiment containing the polybenzoxazine resin I (hereinafter referred to as a "binder resin I") and an embodiment containing the polybenzoxazine resin II (hereinafter referred to as a "binder resin II").

(Binder Resin I)

The binder resin I of the present invention contains a polybenzoxazine resin I which is, as described above, a condensation reaction product of an aminophenol compound with formaldehydes.

<Aminophenol Compound>

As to the aminophenol, for example, a compound represented by formula (1):

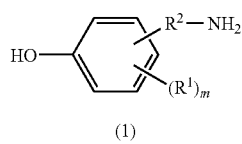

[Chem 2]

(1)

(wherein $R^1$ represents an alkyl or alkoxy group having a carbon number of 1 to 4, $R^2$ represents a single bond, a methylene group, an ethylene group or a trimethylene group, and m represents an integer of 0 to 3) can be used.

In formula (1), the alkyl group having 1 to 4 carbon atoms, represented by $R^1$, includes a methyl group, an ethyl group, an n-propyl group, an isopropyl group, an n-butyl group, an isobutyl group, a sec-butyl group, a tert-butyl group and the like, and the alkoxy group having 1 to 4 carbon atoms, represented by $R^1$, includes a methoxy group, an ethoxy group, an n-propoxy group, an isopropoxy group, an n-butoxy group, an isobutoxy group, a sec-butoxy group, a tert-butoxy group and the like.

$R^2$ represents a single bond, a methylene group, an ethylene group or a trimethylene group, but in view of reactivity, heat resistance and the like, is preferably a single bond, a methylene group or an ethylene group, more preferably a single bond. m represents an integer of 0 to 3, but in view of reactivity, heat resistance and the like, m is preferably 0.

In this aminophenol compound, the position of the amino or aminoalkyl group with respect to the hydroxy group is, in view of reactivity, preferably m- or p-position, more preferably the p-position.

Examples of the aminophenol compound where the amino or aminoalkyl group is at p-position with respect to the hydroxy group include p-aminophenol, 4-amino-3-methylphenol, 4-amino-3-ethylphenol, 4-amino-3-n-propylphenol, 4-amino-3-isopropylphenol, 4-amino-3-methoxyphenol, 4-amino-3-ethoxyphenol, 4-amino-3-n-propoxyphenol, 4-amino-3-isopropoxyphenol, 4-hydroxybenzylamine, 4-hydroxy-2-methylbenzylamine, 2-ethyl-4-hydroxybenzylamine, 4-hydroxy-2-n-propylbenzylamine, 4-hydroxy-2-isopropylbenzylamine, 4-hydroxy-2-methoxybenzylamine, 2-ethoxy-4-hydroxybenzylamine, 4-hydroxy-2-n-propoxybenzylamine, 4-hydroxy-2-isopropoxy-benzylamine, 4-hydroxyphenethylamine, 4-hydroxy-2-methylphenethylamine, 2-ethyl-4-hydroxyphenethylamine, 4-hydroxy-2-n-propylphenethylamine, 4-hydroxy-2-isopropyl-phenethylamine, 4-hydroxy-2-methoxyphenethylamine, 2-ethoxy-4-hydroxyphenethylamine, 4-hydroxy-2-n-propoxy-phenethylamine, 4-hydroxy-2-isopropoxyphenethylamine and the like.

One of these compounds may be used alone, or two or more kinds thereof may be used in combination. Among these, in view of reactivity, heat resistance and the like, p-aminophenol, 4-hydroxybenzylamine and 4-hydroxyphenethyl-amine are preferred, and p-aminophenol is more preferred.

Examples of formaldehydes used in the condensation reaction of the aminophenol compound include formalin, paraformaldehyde, trioxane and the like.

<Structure of Polybenzoxazine Resin I>

The polybenzoxazine resin I which is a condensation reaction product of an aminophenol compound with formaldehydes generally has a structure represented by the following formula (3):

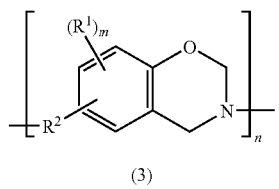

[Chem 3]

(3)

(wherein $R^1$, $R^2$ and m are the same as above, and n represents a degree of polymerization).

The degree of polymerization n is usually from 2 to 30, preferably from 2 to 20, more preferably from 2 to 10.

In the case of using one kind of the aminophenol compound, where the amino or aminoalkyl group is at p-position with respect to the hydroxyl group, and reacting it with formaldehydes, a polybenzoxazine resin I-a having a structure represented by the following formula (3-A) is obtained:

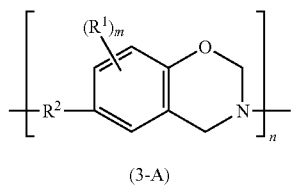

[Chem 4]

(3-A)

(wherein $R^1$, $R^2$ and m are the same as above, and n represents a degree of polymerization).

The degree of polymerization n is usually from 2 to 30, preferably from 2 to 20, more preferably from 2 to 10.

In the case of using two or more kinds of the aminophenol compounds described above, for example, using p-aminophenol and 4-hydroxyphenethylamine, a polybenzoxazine resin I-b having a structure represented by the following formula (4) is obtained:

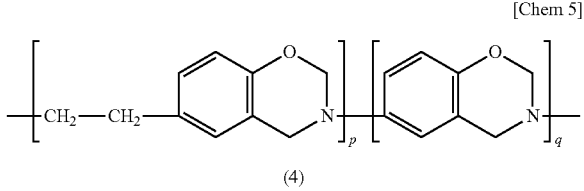

[Chem 5]

(4)

(wherein p and q each represents a degree of polymerization).

The degrees of polymerization p and q each is usually from 2 to 30, preferably from 2 to 20, more preferably from 2 to 10.

In the binder resin I of the present invention, one of these polybenzoxazine resins may be used, or two or more kinds thereof may be used in combination.

A weight average molecular weight (as measured in accordance with JIS K 6910) of the polybenzoxazine resin contained in the binder resin I of the present invention is usually from 300 to 4000, preferably from 300 to 2500, more preferably from 300 to 1500.

A melting point of the polybenzoxazine resin contained in the binder resin I of the present invention is preferably from 90 to 130° C.

An average degree of polymerization of the polybenzoxazine resin contained in the binder resin I of the present invention is usually from 2 to 30, preferably from 2 to 20, more preferably from 2 to 10.

(Binder Resin II)

The binder resin II of the present invention contains a polybenzoxazine resin II which is a condensation reaction product of a bifunctional phenol compound and a bifunctional amine compound with formaldehydes.

<Bifunctional Phenol Compound>

The bifunctional phenol compound used as one of raw materials of the polybenzoxazine resin II which is the binder resin II of the present invention include, for example, a compound represented by the following formula (5):

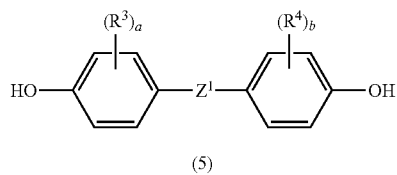

[Chem 6]

(5)

In formula (5), $R^3$ and $R^4$ each independently represents an alkyl or alkoxy group having 1 to 4 carbon atoms, and a and b each represents an integer of 0 to 3. The alkyl or alkoxy group having 1 to 4 carbon atoms is as described above for $R^1$ in formula (1). Also, in view of reactivity and heat resistance, a and b both are preferably 0.

$Z^1$ represents a single bond, —$SO_2$—, —SO—, —S—, —O—, —CO—, a methylene group, an ethylene group or an isopropylidene group.

As for the bifunctional phenol compound represented by formula (5), in view of availability, reactivity, heat resistance and the like, preferred examples thereof include biphenol, bis(4-hydroxyphenyl)methane (biphenol F), and 2,2-bis(4-hydroxyphenyl)propane (bisphenol A), which are a compound where a and b are 0 and $Z^1$ is a single bond, a methylene group or an isopropylidene group. Among these, 2,2-bis(4-hydroxyphenyl)propane is more preferred. As for the bifunctional phenol compound other than formula (5), for example, hydroquinone may be used.

One of these bifunctional phenol compounds may be used alone, or two or more kinds thereof may be used in combination.

<Bifunctional Amine Compound>

The bifunctional amine compound used as another raw material of the polybenzoxazine resin II which is the binder resin II of the present invention is preferably f an aromatic-based compound in view of heat resistance.

The aromatic-based bifunctional amine compound includes, for example, a compound represented by the following formula (6):

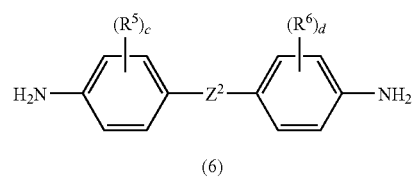

[Chem 7]

(6)

In formula (6), $R^5$ and $R^6$ each independently represents an alkyl or alkoxy group having of 1 to 4 carbon atoms, and c and d each represents an integer of 0 to 4. The alkyl or alkoxy group having 1 to 4 carbon atoms is as described above for $R^1$ in formula (1). Also, in view of reactivity and heat resistance, c and d both are preferably 0.

$Z^2$ represents a single bond, —$SO_2$—, —SO—, —S—, —O—, —CO—, a methylene group, an ethylene group or an isopropylidene group.

As for the aromatic-based bifunctional amine compound represented by formula (6), in view of availability, reactivity, heat resistance and the like, preferred examples thereof include 4,4'-diaminodiphenyl, 4,4'-diaminodiphenylmethane and 2,2-bis(4-aminophenyl)propane, which are a compound where c and d are 0 and $Z^2$ is a single bond, a methylene group or an isopropylidene group. Among these, 4,4'-diaminodiphenylmethane is more preferred. As for other aromatic-based bifunctional amine compounds, for example, p-phenylenediamine may be used.

Examples of the formaldehydes which can be used for the condensation reaction with the bifunctional phenol compound and the bifunctional amine compound include formalin, paraformaldehyde, trioxane and the like.

<Structure of Polybenzoxazine Resin II>

In the case of using one kind of the compound represented by formula (5) as the bifunctional phenol compound and one kind of an aromatic-based amine compound represented by formula (6) as the bifunctional amine compound and reacting these compounds with the formaldehydes, a polybenzoxazine resin II having a structure represented by the following formula (7) is obtained.

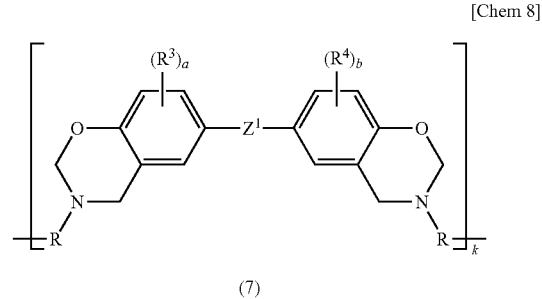

[Chem 8]

(7)

(wherein R represents a divalent group represented by the following formula:

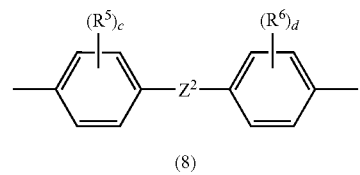

[Chem 9]

(8)

k represents a degree of polymerization, and $R^3$, $R^4$, $R^5$, $R^6$, $Z^1$, $Z^2$, a, b, c and d are the same as those described above).

The degree of polymerization k is usually from 1 to 15, preferably from 1 to 10, more preferably from 1 to 5.

In the binder resin II of the present invention, one kind of the polybenzoxazine resin II may be used alone, or two or more kinds thereof may be used in combination.

A weight average molecular weight (as measured in accordance with JIS K 6910) of the polybenzoxazine resin contained in the binder resin II of the present invention is usually from 450 to 6500, preferably from 450 to 4500, more preferably from 450 to 2000.

A melting point of the polybenzoxazine resin contained in the binder resin II of the present invention is preferably from 90 to 130° C.

An average degree of polymerization of the polybenzoxazine resin contained in the binder resin II of the present invention is usually from 1 to 15, preferably from 1 to 10, more preferably from 1 to 5.

(Production of Polybenzoxazine Resin)
<Polybenzoxazine Resin I>

The polybenzoxazine resin I used as the binder resin I of the present invention can be produced by condensation reacting the aminophenol compound represented by formula (1) with the formaldehydes.

Examples of the formaldehydes used here include formalin, paraformaldehyde, trioxane and the like.

In the condensation reaction, the formaldehydes are preferably reacted in a ratio of 1.5 to 2 mol per 1 mol of the aminophenol compound represented by formula (1).

The reaction may be performed by using an appropriate solvent, for example, a lower alcohol such as methanol and ethanol, ketones such as methyl ethyl ketone and methyl isobutyl ketone, ethers such as tetrahydrofuran and dioxane, chlorinated hydrocarbons such as methylene chloride and chloroform, aromatic hydrocarbons such as benzene, toluene and xylene, or a mixed solvent thereof or the like, and heat-treating the reaction system at a temperature of approximately from 50 to 120° C., preferably from 60 to 80° C. After the completion of the reaction, the reaction product is subjected to solid-liquid separation and drying or removal of the solvent by distillation under reduced pressure, whereby the polybenzoxazine resin I represented by formula (3-A) is obtained.

<Polybenzoxazine Resin II>

The polybenzoxazine resin II used as the binder resin II of the present invention can be produced, for example, by condensation reacting the bifunctional phenol compound represented by formula (5) and the aromatic bifunctional amine compound represented by formula (6) with the formaldehydes. The formaldehydes are as described above for the production of the polybenzoxazine rein I.

In the condensation reaction, it is preferred, for example, to use the aromatic-based bifunctional amine compound represented by formula (6) in a ratio of preferably from 0.5 to 1 mol and the formaldehydes in a ratio of 2 to 4 mol, per 1 mol of the bifunctional phenol compound represented by formula (5).

The reaction may be performed by heat-treating the reaction system at a temperature of approximately from 50 to 120° C., preferably from 60 to 80° C., in an appropriate solvent. As for the solvent, those described above for the production of the polybenzoxazine resin I can be used.

After the completion of the reaction, the reaction product is subjected to solid-liquid separation and drying or removal of the solvent by distillation under reduced pressure, whereby the polybenzoxazine resin II represented by formula (7) is obtained.

The thus-obtained polybenzoxazine resin I or II and the binder resin containing such a resin have the following properties and performances.

In the polybenzoxazine resins I and II for use in the present invention and the binder resin of the present invention containing such a resin, the dihydrobenzoxazine ring is ring-opened at a high temperature in a short time to effect self-crosslinking and therefore, reduction in the heat-curing time and realization of easy molding are achieved.

Also, the conventional polybenzoxazine resin causes thermal decomposition of the molecular chain of the polybenzoxazine resin and releases aniline or the like when molded at a high temperature of 180° C. or more, but with regard to the polybenzoxazine resin for use in the present invention, release of aniline or the like is not observed even when molded at a high temperature exceeding 180° C., for example, at a temperature of approximately from 250 to 300° C. Furthermore, by virtue of such high-temperature molding, a post-curing step can be omitted.

The post-curing step is a reheat-treating step at a temperature of 200 to 300° C. conducted after the thermoforming step at a temperature of 130 to 180° C. The post-curing step is conducted for curing reaction of uncured resins after the thermoforming step. The time of the post-curing step depends on the objective composition of the reheat-treating, but is usually 1 to 15 hours.

The binder resin composition of the present invention is described below.

[Binder Resin Composition for Friction Material]

The binder resin composition for a friction material (hereinafter sometimes simply referred to as a "binder resin composition") of the present invention is a composition containing (A) the polybenzoxazine resin above and (B) one kind or two or more kinds of particles selected from an inorganic particle and an inorganic-organic composite particle. The polybenzoxazine resin used as the component (A) is as described above.

<One Kind or Two or More Kinds of Particles Selected from Inorganic Particle and Inorganic-Organic Composite Particle>

In the binder resin composition of the present invention, the inorganic particle or inorganic-organic composite particle used as the component (B) is not particularly limited but may be sufficient if it can be finely dispersed in the polybenzoxazine resin I or II above and can enhance the heat resistance of the polybenzoxazine resin I or II and suppress a rapid increase of the wear amount, and an inorganic fine particle or inorganic-organic composite particle obtained by a sol-gel reaction of a metal alkoxide compound described below is preferred in view of particle diameter, dispersibility and interaction with the polybenzoxazine resin.

<Metal Alkoxide Compound>

In the present invention, the metal alkoxide includes, for example, a compound represented by formula (2):

 (2)

In formula (2), $Q^1$ represents a hydrocarbon group having 1 to 10 carbon atoms, and the hydrocarbon group includes an alkyl group having 1 to 10 carbon atoms, an aryl group having 6 to 10 carbon atoms, an aralkyl group having 7 to 10 carbon atoms, and a vinyl group.

The alkyl group having 1 to 10 carbon atoms is preferably an alkyl group having 1 to 6 carbon atoms. This alkyl group may be either linear or branched, and examples thereof include a methyl group, an n-propyl group, an isopropyl group, an n-butyl group, an isobutyl group, a sec-butyl group, a tert-butyl group, various pentyl groups, various hexyl groups and the like.

Examples of the aryl group having 6 to 10 carbon atoms include a phenyl group, a tolyl group, a xylyl group, a naphthyl group and the like, and examples of the aralkyl group having 7 to 10 carbon atoms include a benzyl group, a phenethyl group, a phenylpropyl group and the like.

$Q^2$ represents an alkyl group having 1 to 6 carbon atoms, and examples thereof include those described above for $Q^1$. M represents Si, Ti, Zr or Al. x is a valence of M and represents 3 or 4. y represents an integer of 0 to 2 when M is Si, Ti or Zr, and represents 0 or 1 when M is Al. When a plurality of $Q^1$ are present, the plurality of $Q^1$ may be the same or different. The plurality of $OQ^2$ may be the same or different.

Examples of the metal alkoxide compound represented by formula (2) include, when y=0, a tetraalkoxysilane such as tetramethoxysilane, tetraethoxysilane, tetra-n-propoxysilane, tetraisopropoxysilane, tetra-n-butoxysilane, tetraisobutoxysilane, tetra-sec-butoxysilane and tetra-tert-butoxysilane, and corresponding tetraalkoxytitaniums and tetraalkoxyzirconiums, and further include trimethoxyaluminum, triethoxyaluminum, tri-n-propoxy-aluminum, triisopropoxyaluminum, tri-n-butoxyaluminum, triisobutoxyaluminum, tri-sec-butoxyaluminum, tri-tert-butoxyaluminum and the like.

Examples of the metal alkoxide compound include, when y=1, a hydrocarbyltrialkoxysilane such as methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, vinyltrimethoxysilane and vinyltriethoxysilane, and corresponding hydrocarbyltrialkoxytitaniums and hydrocarbyltrialkoxyzirconiums, and further include methyldimethoxyaluminum, methyldiethoxyaluminum, methyldipropoxyaluminum, methyldiisopropoxyaluminum, ethyldimethoxyaluminum, ethyldiethoxyaluminum, propyldiethoxyaluminum, butyldiethoxyaluminum, phenyldimethoxyaluminum, phenyldiethoxyaluminum, vinyldimethoxyaluminum, vinyldiethoxyaluminum and the like.

Examples of the metal alkoxide compound include, when y=2, a dihydrocarbyldialkoxysilane such as dimethyldimethoxysilane, methylphenyldimethoxysilane, dimethyldiethoxysilane, methylphenyldiethoxysilane, diethyldimethoxysilane, ethylphenyldimethoxysilane, diethyldiethoxysilane and ethylphenyldiethoxysilane, and corresponding dihydrocarbyldialkoxytitaniums, dihydrocarbyldialkoxyzirconiums and the like.

In the present invention, one of these metal alkoxide compounds may be used alone, or two or more kinds thereof may be used in combination.

<Sol-Gel Reaction>

The inorganic particle or inorganic-organic composite particle is formed using the metal alkoxide compound above by a sol-gel reaction. In formula (2), when y is 0, an inorganic particle is formed by a sol-gel reaction, and when y is 1 or 2 (y=1 for Al; y=1 or 2 for Si, Ti and Zr), an inorganic-organic composite particle is formed by a sol-gel reaction.

The sol-gel reaction may be performed by the following method.

The metal alkoxide compound represented by formula (2) and water are added to an appropriate polar solvent, and a hydrolysis condensation reaction is preformed at a temperature of approximately from 10 to 100° C., preferably from 20 to 60° C., for approximately from 1 to 50 hours, preferably from 3 to 12 hours. As for the ratio of the metal alkoxide compound and water used, water is preferably used in a ratio of 1 to 8 mol, preferably from 2 to 4 mol, per 1 mol of the alkoxy group in the metal alkoxide compound.

Examples of the polar solvent include ethers such as tetrahydrofuran and 1,4-dioxane, ketones such as acetone, methyl ethyl ketone and methyl isobutyl ketone, alcohols such as methanol, ethanol and propanol, esters such as methyl acetate, ethyl acetate and propyl acetate and the like. One of these solvents may be used alone, or two or more kinds thereof may be mixed and used.

Incidentally, at the hydrolysis condensation reaction, for example, acetic acid, hydrochloric acid, oxalic acid or nitric acid may be used as an acidic catalyst, and sodium hydroxide or potassium hydroxide may be used as an alkali catalyst.

For finely dispersing one kind or two or more kinds of particles selected from the thus-obtained inorganic particle or inorganic-organic composite particle in the polybenzoxazine resin I or II, one kind or two or more kinds of particles selected from the inorganic particle and inorganic-organic composite particle are preferably allowed to be present in the reaction system at the synthesis of the polybenzoxazine resin I or II.

<Particle Diameter and Content of Component (B)>

In the binder resin composition of the present invention, the average particle diameter of the inorganic particle or inorganic-organic composite particle contained as the component (B) is, in view of dispersibility and effect, preferably from 10 to 300 nm, more preferably from 20 to 100 nm.

Also, the content of the component (B) is, in terms of a metal atom, preferably from 1 to 30% by mass, more preferably from 5 to 20% by mass, based on the total amount of the polybenzoxazine resin as the component (A) and the component (B). If this content is less than 1% by mass, the effect achieved by containing the component (B) is not fully exerted, whereas if it exceeds 30% by mass, the melt viscosity of the binder resin composition becomes too high and the moldability decreases.

The composite material for a friction material of the present invention is described below.

[Composite Material for Friction Material]

The composite material for a friction material (hereinafter sometimes simply referred to as a "composite material") of the present invention contains the above-described binder resin composition for a friction material, a fibrous reinforcement, a lubricant and a friction modifier and is used as a molding material for a friction material.

(Fibrous Reinforcement)

As for the fibrous reinforcement in the composite material of the present invention, an organic fiber and an inorganic fiber both may be used. Examples of the organic fiber include a high-strength aromatic polyamide fiber (aramid fiber; "KEVLAR", trade name, produced by DuPont K.K.), flame-resisted acrylic fiber, polyimide fiber, polyacrylate fiber, polyester fiber and the like. Examples of the inorganic fiber include an inorganic fiber such as potassium titanate fiber, basalt fiber and silicon carbide fiber; glass fiber; carbon fiber; a mineral fiber such as wollastonite, sepiolite, attapulgite, halloysite, mordenite and rock wool; a ceramic fiber such as alumina silica-based fiber; a metal fiber such as aluminum fiber, stainless steel fiber, steel fiber, copper fiber, brass fiber, nickel fiber and iron fiber, and the like. One of these fibrous substances may be used alone, or two or more kinds thereof may be used in combination.

(Lubricant)

The lubricant in the composite material of the present invention is not particularly limited, and an arbitrary lubricant may be suitably selected from those known and conventionally used as a lubricant in the friction material. Specific examples of the lubricant include black lead, graphite fluoride, carbon black, graphite, a metal sulfide such as molybdenum disulfide, antimony sulfide, tin sulfide and tungsten disulfide, polytetrafluoroethylene (PTFE), boron nitride and the like. One of these may be used alone, or two or more kinds thereof may be used in combination.

(Friction Modifier)

The friction modifier in the composite material of the present invention is not particularly limited, and an arbitrary friction modifier may be suitably selected from those known and conventionally used as a friction modifier in the friction material. Specific examples of the friction modifier include an inorganic friction modifier such as metal oxide (e.g., alumina, silica, magnesia, zirconia, iron oxide), zirconium silicate, silicon carbide, metal powders (e.g., copper, brass, zinc, iron), titanate powder and the like; and an organic friction modifier such as rubber dust (e.g., NBR, SBR, tire tread), organic dust (e.g., cashew dust) and the like. One of these may be used alone, or two or more kinds thereof may be used in combination.

(Other Fillers)

In the composite material of the present invention, a swelling clay mineral may be contained as a filler other than the reinforcement, friction modifier and the like. Examples of the swelling clay mineral include a smectite-type clay mineral such as montmorillonite, saponite, beidellite, nontronite, hectorite and stevensite, vermiculite, halloysite, kaolin, talc, mica and the like. These may be a natural product or a synthetic product. Among these, montmorillonite is preferred in view of reinforcement-enhancing effect and the like.

Also, calcium carbonate, barium carbonate, calcium sulfate, barium sulfate, calcium hydroxide or the like may be contained as an extender.

Incidentally, in the composite material of the present invention, as for the inorganic filler out of the above-described lubricant, friction modifier and other fillers, a filler treated with an organic compound can be used because it exhibits good dispersibility in the composite material.

Examples of the filler treated with an organic compound include those obtained by treating a swelling clay mineral, calcium carbonate, barium sulfate, magnesia, alumina, zirconia, silica, aluminum powder, copper powder, zinc powder, graphite, molybdenum disulfide, antimony sulfide, tin sulfide, tungsten disulfide or the like, with an organic compound. The swelling clay mineral has a layered structure and when treated with an organic compound, not only forms an intercalation compound but also causes interlayer expansion to readily allow peeling, thereby enhancing the dispersibility in the composite material of the present invention.

Examples of the organic compound used for the treatment of the swelling clay mineral include amines, a quaternary ammonium salt and the like. As to the amines, for example, an aliphatic amine or aromatic amine having 1 to 18 carbon atoms may be used. Specific examples of the aliphatic amine include a hydrochloride and a bromate of diethylamine, amylamine, dodecylamine, stearylamine and didodecylmethylamine, and specific examples of the aromatic amine include aniline, toluidine, xylidine and phenylenediamine. Among these amines, aniline is preferred. Preferred examples of the quaternary ammonium salt include dimethyldioctadecylammonium chloride, oleylbis(2-hydroxyethyl)methylammonium chloride and the like.

The treatment of the filler other than the swelling clay mineral, such as calcium carbonate, barium sulfate, magnesia, alumina, zirconia, silica, aluminum powder, copper powder, zinc powder, graphite, molybdenum disulfide, antimony sulfide, tin sulfide and tungsten disulfide, with an organic compound is preferably performed using, as the organic compound, an aliphatic or aromatic primary amine having approximately from 10 to 35 carbon atoms, a silane coupling agent having a primary amine group at the terminal, or the like.

Examples of the aliphatic or aromatic primary amine include n-dodecylamine, n-hexadecylamine, n-octadecylamine, n-nonadecylamine, p-tert-butylaniline, p-octylaniline, p-dodecylaniline and the like, and examples of the silane coupling agent include 3-aminopropyltrimethoxysilane, 3-aminopropyltriethoxysilane and the like. Among these, n-dodecylamine is preferred.

The method for treating the filler with the above-described organic compound is not particularly limited and there may be used, for example, a method of treating the filler by using the organic compound in a melt state as it is, or a method of using the organic compound in a solution state by dissolving it in an appropriate organic solvent.

The method for incorporating the filler treated with the organic compound into the composite material is not particularly limited, but a method of melt-kneading the filler together with other components may be used, or from the standpoint of dispersibility, the filler may be mixed in the process of producing the polybenzoxazine resin.

The friction material of the present invention and the production method thereof are described below.

[Friction Material and Production Method Thereof]

(Friction Material)

The friction material of the present invention is obtained using the above-described binder resin (I or II) for a friction material or the above-described composite material for a friction material.

In the case of using the binder resin (I or II), a composite material containing a fibrous reinforcement, a lubricant and a friction modifier together with the binder resin I comprising the polybenzoxazine resin I and/or the binder resin II comprising the polybenzoxazine resin II is used, and the composite material is thermoformed, whereby the friction material can be produced. Incidentally, examples of the fibrous reinforcement, lubricant, friction modifier and the like used here include the same as those described above.

In the case where the above-described composite material for a friction material is used as the molding material of the friction material of the present invention, the composite material contains, as described above, one kind or two or more kinds of resins selected from the polybenzoxazine resin I and polybenzoxazine resin II each having a high molecular weight, and one kind or two or more kinds of particles selected from the organic particle and inorganic-organic composite particle each produced preferably by a sol-gel reaction, and therefore, not only the thermal decomposition property is enhanced but also a rapid increase in the wear amount can be suppressed. In addition to these properties, a friction material having good dynamic property can be thermoformed at a high temperature in a short time.

The friction material of the present invention is very effective as a non-asbestos friction material for a brake used for a brake pad of an automobile and the like.

(Production of Friction Material)

In the present invention, the above-described composite material is filled in a mold or the like, preformed usually at ordinary temperature under a pressure of approximately from 5 to 30 MPa, and then compression-molded for 2 to 10 minutes under the conditions of a temperature of 150 to 300° C., preferably from 230 to 300° C., and a pressure of approximately from 10 to 100 MPa, whereby a desired friction material can be produced.

According to the present invention, by performing such high-temperature molding, a post-heating operation can be omitted and moreover, since the molding is completed in a short time, not only high production efficient and low production cost can be achieved but also release of a pyrolysis component during molding can be suppressed.

Incidentally, the post-heating operation means the same operation as the above-described post-curing step.

EXAMPLES

The present invention is described in greater detail below by referring to Examples, but the present invention is not limited thereto by any means.

In Examples 1-1 to 1-4, the binder resin of the present invention and the friction material obtained using the binder resin are described. Incidentally, evaluation tests of various properties were performed as follows.
<Various Properties of Resin>
(1) Gel Time While kneading 1 g of a resin powder on a hot plate at 180° C., the time (sec) until the resin became unsticky was measured and used as a gel time.
(2) Heat Resistance A measurement sample produced by heating the resin at 180° C. for 1 hour and further at 250° C. for 3 hours and then pulverizing was measured by a differential thermal balance with an airflow amount of 100 ml at 25 to 800° C. to determine a mass retention rate at 600° C.
<Various Properties of Friction Material>
(3) Moldability The presence or absence of a molding failure (cracks) was inspected on 200 units of the sample with an eye or by a hammering test, and a non-defective rate was determined by calculation.
(4) Gas Generation Status The generation of a gas during molding was observed with an eye or by an odor.
(5) Rockwell Hardness After thermoforming and after post-heating treatment, the Rockwell hardness was measured in accordance with JIS D4421.
(6) Acetone Extraction Rate The sample after thermoforming and after post-heating treatment was subjected to a Soxhlet extraction test with acetone under the conditions of a reflux temperature and 4 hours, and the acetone extraction rate was measured.
(7) Fade Test A test piece was cut out from the friction material and subjected to a fade test by using a test piece tester in accordance with JASO-C406-82, and a minimum friction coefficient of the first fade and the wear amount of the friction material after the test were measured.

Example 1-1

A four-neck flask was charged with 300 g of p-aminophenol, 176 g of paraformaldehyde, 675 g of chloroform and 675 g of 1,4-dioxane, and the contents were reacted under reflux for 5 hours.

After the completion of reaction, the reaction solution was filtered, and the obtained filtrate was washed with 1,000 ml of an aqueous sodium hydrogencarbonate solution in a concentration of 1 mol/liter and then washed with 3,000 ml of distilled water. The washed material after water washing was dried under reduced pressure at 70° C. in a vacuum oven and then pulverized to obtain 366 g of Binder Resin A comprising a polybenzoxazine resin. With respect to this Binder Resin A, the gel time and heat resistance (mass retention rate) were determined. The results obtained are shown in Table 2.

Example 1-2

A four-neck flask was charged with 200 g of 2,2-bis(4-hydroxyphenyl)propane (bisphenol A), 174 g of 4,4'-diaminodiphenylmethane, 105 g of paraformaldehyde, 675 g of chloroform and 675 g of 1,4-dioxane, and the contents were reacted under reflux for 5 hours.

After the completion of reaction, the reaction solution was filtered, and the obtained filtrate was washed with 1,000 ml of an aqueous sodium hydrogencarbonate solution in a concentration of 1 mol/liter and then washed with 3,000 ml of distilled water. The washed material after water washing was dried under reduced pressure at 70° C. in a vacuum oven and then pulverized to obtain 416 g of Binder Resin B comprising a polybenzoxazine resin. With respect to this Binder Resin B, the gel time and heat resistance (mass retention rate) were determined. The results obtained are shown in Table 2.

Comparative Example 1-1

A four-neck flask was charged with 300 g of 2,2-bis(4-hydroxyphenyl)propane (bisphenol A), 245 g of aniline, 158 g of paraformaldehyde and 300 g of methyl ethyl ketone, and the contents were heated and stirred at 40° C. for 1 hour and further at 50° C. for 1 hour and then reacted under reflux for 4 hours. After the reaction, the solvent was removed under reduced pressure of 0.06 MPa for 1 hour and then cooled, and the obtained solid matter was pulverized to obtain 608 g of Binder Resin C comprising a polybenzoxazine resin. With respect to this Binder Resin C, the gel time and heat resistance (mass retention rate) were determined. The results obtained are shown in Table 2.

Examples 1-3 and 1-4 and Comparative Examples 1-2 to 1-4

The components each in an amount shown in Table 1 were mixed by a mixer and after charging the mixture into a preform mold, preforming by compression was performed under the conditions of ordinary temperature and 30 MPa.

Subsequently, this preformed body and a pressure plate previously coated with an adhesive were set in a thermoforming mold and by performing heating compression molding under the following conditions, a friction material was produced and measured for various properties.
<Molding Conditions>

(1) Molding pressure: 50 MPa, molding temperature: 180° C., molding time: 300 seconds.

(2) Molding pressure: 50 MPa, molding temperature: 250° C., molding time: 180 seconds.

Incidentally, the 180° C. molded article of (1) above was, after thermoforming, subjected to a post-heating treatment at 250° C. for 3 hours, and the Rockwell hardness and acetone extraction rate were measured also for this post-heat treated product.

The results obtained are shown in Table 2.

TABLE 1

|  |  | Example 1-3 | Example 1-4 | Comparative Example 1-2 | Comparative Example 1-3 | Comparative Example 1-4 |
|---|---|---|---|---|---|---|
| Blending Composition (parts by mass) | Example 1-1, Resin A | 10 | — | — | — | — |
|  | Example 1-2, Resin B | — | 10 | — | — | — |
|  | Comparative Example 1-1, Resin C | — | — | 10 | 7 | — |
|  | Phenol novolak resin | — | — | — | 3 | 10 |
|  | Hexamethylenetetramine | 0 | 0 | 0 | 0 | 1 |
|  | Aramid pulp | 5 | 5 | 5 | 5 | 5 |
|  | Inorganic fiber | 20 | 20 | 20 | 20 | 20 |
|  | Copper fiber | 13 | 13 | 13 | 13 | 13 |
|  | Zirconium silicate | 3 | 3 | 3 | 3 | 3 |
|  | Barium sulfate | 35 | 35 | 35 | 35 | 35 |
|  | Graphite | 6 | 6 | 6 | 6 | 6 |
|  | Rubber dust | 4 | 4 | 4 | 4 | 4 |
|  | Cashew dust | 4 | 4 | 4 | 4 | 4 |

TABLE 2

|  |  |  | Example 1-3 | Example 1-4 | Comparative Example 1-2 | Comparative Example 1-3 | Comparative Example 1-4 |
|---|---|---|---|---|---|---|---|
| Properties of Resin | Kind of resin |  | Resin A | Resin B | Resin C | Resin C phenol novolak | phenol novolak |
|  | Gel time (sec) |  | 25 | 28 | 1800< | 30 | 27 |
|  | Heat resistance [mass retention rate] (%) |  | 31 | 31 | 30 | 25 | 5 |
| Molding Conditions (1) [180° C. × 300 sec] | Non-defective rate (%) |  | 100 | 100 | 0 (unmoldable) | 100 | 98 |
|  | Gas generation status |  | none | none | none | none | generated |
|  | Rockwell hardness (HRS) | After thermoforming | 71 | 69 | unmeasurable | 68 | 73 |
|  |  | After post-heating | 73 | 74 | unmeasurable | 70 | 77 |
|  | Acetone extraction rate (%) | After thermoforming | 4.2 | 4.3 | — | 6.2 | 3.1 |
|  |  | After post-heating | 0.9 | 1.1 | — | 3.3 | 1 |
|  | Fade test | Minimum friction coefficient | 0.28 | 0.27 | — | 0.23 | 0.23 |
|  |  | Wear amount of friction material | 0.47 mm | 0.48 mm | — | 0.55 mm | 0.57 mm |
| Molding Conditions (2) [250° C. × 180 sec] | Non-defective rate (%) |  | 100 | 100 | 0 (unmoldable) | 0 | 0 |
|  | Gas generation status |  | none | none | none | generated | generated |
|  | Rockwell hardness (HRS) |  | 72 | 71 | — | — | — |
|  | Acetone extraction rate (%) |  | 1.2 | 1.4 | — | — | — |
|  | Fade test | Minimum friction coefficient | 0.28 | 0.28 | — | — | — |
|  |  | Wear amount of friction material | 0.50 mm | 0.49 mm | — | — | — |

Table 2 reveals the followings.

In Comparative Example 1-2, the curing time of Resin C was long and molding could not be performed. In Comparative Examples 1-3 and 1-4, molding could be performed at 180° C. but could not be performed at 250° C. Also, in Comparative Example 1-3, a gas was not generated during molding at 180° C. but generated during molding at 250° C.

On the other hand, in Examples 1-3 and 1-4, generation of a gas did not occur during molding even at 250° C. and molding could be performed. Also, in Examples 1-3 and 1-4, the physical properties (Rockwell hardness, acetone extraction rate) of the friction material molded at 250° C. were equal to the characteristic features of a friction material obtained by post-heat treating the 180° C. molded article and even when the post-heating step was omitted, a serious problem did not arise.

The friction materials of Examples 1-3 and 1-4 were an excellent friction material where as a result of fade being suppressed by virtue of excellent heat resistance of the binder resin, the minimum friction coefficient was enhanced and the wear amount of the friction material was reduced.

In Examples 2-1 to 2-8 below, the binder resin composition of the present invention and the friction material obtained using the binder resin composition are described. Incidentally, various properties of the binder resin composition and friction material in each Example were determined by the following methods.

<Binder Resin Composition>

(1) Heat Resistance

A measurement sample produced by heat-treating each binder resin composition at 180° C. for 1 hour and further at 250° C. for 3 hours and then pulverizing was measured by a differential thermal balance ["TG/DTA6300", model name, manufactured by SII NanoTechnology Inc.] under the conditions of an airflow amount of 100 ml and a temperature of 25 to 800° C. to determine the mass retention rate at 600° C. The value obtained is indicated by an index with respect to the mass retention rate of a phenol novolak resin, which is taken as 1.

(2) Silicon (Si) Content

Each measurement sample produced in the same manner as in (1) above was put in a fluorescent X-ray analyzer ["ZSX Primus II", model name, manufactured by Rigaku Corporation] and measured for the silicon content. Incidentally, the silicon content is percent by mass based on the total amount of the polybenzoxazine resin and the hydrolysis condensate (as solid content) of phenyltriethoxysilane.

(3) Average Particle Diameter of Phenyltriethoxysilane Hydrolysis Condensate in Binder Resin Composition Each binder resin (0.5 g) was sandwiched between S45C-made iron plates and compression-molded at 200° C. under a load of 5 t for 4 minutes to produce a resin film.

After a slice was cut out from the resin film, the phenyltriethoxysilane hydrolysis condensate was observed by a scanning transmission electron microscope, HD-2300A, manufactured by Hitachi High-Technologies Corporation and from the distribution of the measured particle diameters, an average particle diameter was determined.

<Friction Material>
(4) Rockwell Hardness

The sample after thermoforming and the sample after post-heat treatment each was measured for the Rockwell hardness in accordance with JIS D4421.

(5) Friction Test

Each friction material was subjected to a high load friction test under the following conditions by using a full-size dynamo tester, and an average friction coefficient and a wear amount of the friction material were measured.

Friction Test Conditions:

| | |
|---|---|
| Initial speed: | 150 km/h |
| Final speed: | 3 km/h |
| Deceleration: | 5 m/s$^2$ |
| Rotor temperature at start of braking: | 500° C. |
| Number of braking operations: | 200 |

Incidentally, the phenol novolak resin used in these Examples is "2075", trade name, produced by Cashew Co., Ltd.

Comparative Example 2-1

A four-neck flask was charged with 300 g of p-aminophenol, 176 g of paraformaldehyde and 900 g of tetrahydrofuran, and the contents were reacted under reflux for 6 hours. Subsequently, the reaction solution was dried under reduced pressure at 100° C. for 10 hours in a vacuum oven and then pulverized to obtain Binder Resin A.

Example 2-1

A beaker was charged with 80 g of phenyltriethoxysilane, 16 g of acetic acid and 12 g of distilled water and after stirring at 40° C. for 5 hours, the resulting solution was washed with 500 mL of distilled water.

A four-neck flask was charged with the washed material above, 300 g of p-aminophenol, 176 g of paraformaldehyde and 900 g of tetrahydrofuran, and the contents were reacted under reflux for 6 hours. Subsequently, the reaction solution was dried under reduced pressure at 100° C. for 10 hours in a vacuum oven and then pulverized to obtain Binder Resin Composition B.

Example 2-2

A beaker was charged with 310 g of phenyltriethoxysilane, 64 g of acetic acid and 48 g of distilled water and after stirring at 40° C. for 5 hours, the resulting solution was washed with 1,000 mL of distilled water.

A four-neck flask was charged with the washed material above, 300 g of p-aminophenol, 176 g of paraformaldehyde and 900 g of tetrahydrofuran, and the contents were reacted under reflux for 6 hours. Subsequently, the reaction solution was dried under reduced pressure at 100° C. for 10 hours in a vacuum oven and then pulverized to obtain Binder Resin Composition C.

Comparative Example 2-2

A four-neck flask was charged with 200 g of 2,2-bis(hydroxyphenyl)propane (bisphenol A), 174 g of 4,4'-diaminodiphenylmethane, 53 g of paraformaldehyde and 900 g of tetrahydrofuran, and the contents were reacted under reflux for 6 hours. Subsequently, the reaction solution was dried under reduced pressure at 100° C. for 10 hours in a vacuum oven and then pulverized to obtain Binder Resin D.

Example 2-3

A beaker was charged with 79 g of phenyltriethoxysilane, 16 g of acetic acid and 12 g of distilled water and after stirring at 40° C. for 5 hours, the resulting solution was washed with 500 mL of distilled water.

A four-neck flask was charged with the washed material above, 200 g of bisphenol A, 174 g of 4,4'-diaminodiphenylmethane, 56 g of paraformaldehyde and 900 g of tetrahydrofuran, and the contents were reacted under reflux for 6 hours. Subsequently, the reaction solution was dried under reduced pressure at 100° C. for 10 hours in a vacuum oven and then pulverized to obtain Binder Resin Composition E.

Example 2-4

A beaker was charged with 305 g of phenyltriethoxysilane, 63 g of acetic acid and 47 g of distilled water and after stirring at 40° C. for 5 hours, the resulting solution was washed with 1,000 mL of distilled water.

A four-neck flask was charged with the washed material above, 200 g of bisphenol A, 174 g of 4,4'-diaminodiphenylmethane, 56 g of paraformaldehyde and 900 g of tetrahydrofuran, and the contents were reacted under reflux for 6 hours. Subsequently, the reaction solution was dried under reduced pressure at 100° C. for 10 hours in a vacuum oven and then pulverized to obtain Binder Resin Composition F.

Comparative Example 2-3

A four-neck flask was charged with 200 g of bisphenol A, 163 g of aniline, 105 g of paraformaldehyde and 200 g of methyl ethyl ketone and after stirring at 40° C. for 1 hour and further at 50° C. for 1 hour, the contents were reacted under reflux for 4 hours. Subsequently, the solvent was removed under reduced pressure of 0.06 MPa for 1 hour, and the residue was cooled and pulverized to obtain Binder Resin G.

Comparative Example 2-4

A beaker was charged with 83 g of phenyltriethoxysilane, 17 g of acetic acid and 13 g of distilled water and after stirring at 40° C. for 5 hours, the resulting solution was washed with 500 mL of distilled water.

A four-neck flask was charged with the washed material above, 200 g of bisphenol A, 163 g of aniline, 105 g of paraformaldehyde and 200 g of methyl ethyl ketone and after stirring at 40° C. for 1 hour and further at 50° C. for 1 hour, the contents were reacted under reflux for 4 hours. Subsequently, the solvent was removed under reduced pressure of 0.06 MPa for 1 hour, and the residue was cooled and pulverized to obtain Binder Resin Composition H.

Comparative Example 2-5

A beaker was charged with 323 g of phenyltriethoxysilane, 66 g of acetic acid and 50 g of distilled water and after stirring at 40° C. for 5 hours, the resulting solution was washed with 1,000 mL of distilled water.

A four-neck flask was charged with the washed material above, 200 g of bisphenol A, 163 g of aniline, 105 g of paraformaldehyde and 200 g of methyl ethyl ketone and after stirring at 40° C. for 1 hour and further at 50° C. for 1 hour, the contents were reacted under reflux for 4 hours. Subsequently, the solvent was removed under reduced pressure of 0.06 MPa for 1 hour, and the residue was cooled and pulverized to obtain Binder Resin Composition I.

The binder resin compositions of Examples 2-1 to 2-4, the binder resins of Comparative Examples 2-1 to 2-3, and the binder resin compositions of Comparative Examples 2-4 and 2-5 were evaluated for various properties. The results obtained are shown in Table 3.

TABLE 3

| | Binder Resin or Binder Resin Composition | | | |
|---|---|---|---|---|
| | Kind | Heat Resistance (index) | Silicon Content[1] (percent by mass) | Average Particle Diameter of Hydrolysis Condensate of PTES[2] (nm) |
| Comparative Example 2-1 | A | 11 | 0 | — |
| Example 2-1 | B | 16.1 | 2.6 | 50 |
| Example 2-2 | C | 29.1 | 9.2 | 110 |
| Comparative Example 2-2 | D | 10 | 0 | — |
| Example 2-3 | E | 14.7 | 2.6 | 70 |
| Example 2-4 | F | 27.8 | 8.9 | 100 |
| Comparative Example 2-3 | G | 24 | 0 | — |
| Comparative Example 2-4 | H | 26 | 2.1 | 50 |
| Comparative Example 2-5 | I | 30 | 8.2 | 100 |
| Phenol Novolak Resin | | 1 | 0 | — |

[Note]
[1]This is an Si content based on the total amount of polybenzoxazine resin and hydrolysis condensate of PTES and is indicative of the content of phenylethoxysilane (PTES) hydrolysis condensate as an inorganic-organic composite particle in the composition.
[2]PTES: phenyltriethoxysilane

Examples 2-5 to 2-8 and Comparative Examples 2-6 to 2-11

The components in the blending composition shown in Table 4 were mixed by a mixer to prepare a thermosetting resin composite material. After charging this composite material into a preform mold, preforming by compression was performed under at ordinary temperature and 30 MPa to produce each preformed body.

Subsequently, each preformed body and a pressure plate previously coated with an adhesive were set in a thermoforming mold and by performing heating compression molding, and each friction material was produced. The molding conditions are as follows.

In Examples 2-5 to 2-8 and Comparative Examples 2-6 to 2-10

| | |
|---|---|
| Molding pressure: | 50 MPa |
| Molding temperature: | 200° C. |
| Molding time: | 300 seconds |

In Comparative Example 2-11

| | |
|---|---|
| Molding pressure: | 50 MPa |
| Molding temperature: | 150° C. |
| Molding time: | 300 seconds |

Various properties of each friction material are shown in Table 4.

TABLE 4

| | | | Comparative Example 2-6 | Example 2-5 | Example 2-6 | Comparative Example 2-7 | Example 2-7 | Example 2-8 |
|---|---|---|---|---|---|---|---|---|
| Blending Composition (parts by mass) | Binder resin, binder resin composition | Kind | A | B | C | D | E | F |
| | | Blending amount | 10 | 10 | 10 | 10 | 10 | 10 |
| | Phenol novolak resin | | — | — | — | — | — | — |
| | Hexamethylenetetramine | | 0 | 0 | 0 | 0 | 0 | 0 |
| | Amide pulp | | 5 | 5 | 5 | 5 | 5 | 5 |
| | Inorganic fiber | | 10 | 10 | 10 | 10 | 10 | 10 |
| | Iron fiber | | 25 | 25 | 25 | 25 | 25 | 25 |
| | Zirconium silicate | | 7 | 7 | 7 | 7 | 7 | 7 |
| | Barium sulfate | | 25 | 25 | 25 | 25 | 25 | 25 |
| | Graphite | | 10 | 10 | 10 | 10 | 10 | 10 |
| | Rubber dust | | 4 | 4 | 4 | 4 | 4 | 4 |
| | Cashew dust | | 4 | 4 | 4 | 4 | 4 | 4 |
| Evaluation of Friction Material | Rockwell hardness (HRS) | After thermoforming | 70 | 68 | 63 | 71 | 67 | 64 |
| | | Finished product | 67 | 64 | 61 | 67 | 63 | 62 |
| | Friction test | Average friction coefficient | 0.43 | 0.43 | 0.41 | 0.42 | 0.41 | 0.4 |
| | | Wear amount (nm) | 4.2 | 3.5 | 3.4 | 4.4 | 3.5 | 3.4 |

TABLE 4-continued

| | | | Comparative Example 2-8 | Comparative Example 2-9 | Comparative Example 2-10 | Comparative Example 2-11 |
|---|---|---|---|---|---|---|
| Blending Composition (parts by mass) | Binder resin, binder resin composition | Kind | G | H | I | — |
| | | Blending amount | 7 | 7 | 7 | — |
| | Phenol novolak resin | | 3 | 3 | 3 | 10 |
| | Hexamethylenetetramine | | 0 | 0 | 0 | 1 |
| | Amide pulp | | 5 | 5 | 5 | 5 |
| | Inorganic fiber | | 10 | 10 | 10 | 10 |
| | Iron fiber | | 25 | 25 | 25 | 25 |
| | Zirconium silicate | | 7 | 7 | 7 | 7 |
| | Barium sulfate | | 25 | 25 | 25 | 25 |
| | Graphite | | 10 | 10 | 10 | 10 |
| | Rubber dust | | 4 | 4 | 4 | 4 |
| | Cashew dust | | 4 | 4 | 4 | 4 |
| Evaluation of Friction Material | Rockwell hardness (HRS) | After thermoforming | 54 | 53 | 48 | 74 |
| | | Finished product | 51 | 49 | 44 | 68 |
| | Friction test | Average friction coefficient | 0.38 | 0.36 | 0.35 | 0.39 |
| | | Wear amount (nm) | 4.8 | 4.6 | 4.4 | 4.5 |

Table 4 reveals the followings.

As regards the high load friction test, in the friction materials of Examples 2-5 and 2-6, the wear amount was greatly reduced as compared with the corresponding friction material of Comparative Example 2-6. Also, in the friction materials of Examples 2-7 and 2-8, the wear amount was greatly reduced as compared with the corresponding friction material of Comparative Example 2-7.

On the other hand, the friction coefficient of the friction materials of Comparative Examples 2-6 and 2-7 is almost equal to that of the friction materials of Examples 2-5 and 2-6 and Examples 2-7 and 2-8, but improvement is not seen in terms of the wear amount. This is considered because in Comparative Examples 2-6 and 2-7, unlike Examples 2-5 and 2-6 and Examples 2-7 and 2-8, a phenyltriethoxysilane hydrolysis condensate that is an inorganic-organic composite particle is not contained and a reinforcing effect and a heat resistance-enhancing effect are not provided.

Also, in Comparative Examples 2-8, 2-9 and 2-10, the binder resins are a low molecular-weight polybenzoxazine resin and because of its poor moldability, the friction materials are reduced in the hardness and cannot endure the load at high temperatures, as a result, the wear amount is increased.

In Comparative Example 2-11, the binder resin is a conventional phenol novolak resin and because of its poor heat resistance, the wear amount is large.

From these results, it is seen that the friction materials of Examples 2-5 to 2-8 are excellent in the wear resistance at high load friction.

The binder resin for a friction material of the present invention enables high-temperature short-time thermoforming and can omit a post-curing step and suppress the generation of a pyrolysis component at molding. By using this binder resin, a friction material capable of being enhanced in the heat resistance and minimum friction coefficient and reduced in the wear amount can be obtained. Also, the binder resin composition for a friction material of the present invention is enhanced in the heat resistance, can suppress a rapid increase of the wear amount and in addition to these properties, enables high-temperature short-time thermoforming of a friction material having good dynamic property.

The invention claimed is:

1. A binder resin composition for a friction material comprising:
   (A) one kind or two or more kinds of polybenzoxazine resins selected from a condensation reaction product of an aminophenol compound with a formaldehyde and a condensation reaction product of a bifunctional phenol compound and a bifunctional amine compound with a formaldehyde; and
   (B) one kind or two or more kinds of particles selected from an inorganic particle and an inorganic-organic composite particle, wherein the particles are obtained by a sol-gel reaction of a metal alkoxide compound.

2. The binder resin composition for a friction material according to claim 1, wherein the bifunctional phenol compound is 2,2-bis(4-hydroxyphenyl)propane.

3. The binder resin composition for a friction material according to claim 1, wherein the bifunctional amine compound is 4,4'-diaminodiphenylmethane.

4. The binder resin composition for a friction material according to claim 1, wherein the component (B) is a hydrolysis condensate of a metal alkoxide compound represented by formula (2):

$$Q^1{}_y M(OQ^2)_{x-y} \qquad (2)$$

(wherein $Q^1$ represents a hydrocarbon group having 1 to 10 carbon atoms; $Q^2$ represents an alkyl group having 1 to 6 carbon atoms; M represents Si, Ti, Zr or Al; x is a valence of M and represents 3 or 4; y represents an integer of 0 to 2 when M is Si, Ti or Zr, and represents 0 or 1 when M is Al; when a plurality of $Q^1$ are present, the plurality of $Q^1$ may be the same or different; and the plurality of $OQ^2$ may be the same or different).

5. The binder resin composition for a friction material according to claim 1, wherein an average particle diameter of the component (B) is from 10 to 300 nm.

6. The binder resin composition for a friction material according to claim 1, wherein a content of the component (B) is from 1 to 30% by mass in terms of a metal atom based on a total amount of the components (A) and (B).

7. The binder resin composition for a friction material according to claim 1, wherein the component (B) is caused to be present in a reaction system at a synthesis of the polybenzoxazine resin or after the synthesis reaction.

8. A composite material for a friction material comprising the binder resin composition for a friction material according to claim 1, a fibrous reinforcement, a lubricant and a friction modifier.

9. A friction material obtained by curing a composite material containing the binder resin for a friction material according to claim 1.

10. A friction material obtained by curing the composite material for a friction material according to claim 8.

11. A process for producing a friction material comprising thermoforming a composite material containing the binder resin for a friction material according to claim 1 at a temperature of 150 to 300° C.

12. The process for producing a friction material according to claim 11, wherein a post-heating operation is omitted after the thermoforming.

* * * * *